June 12, 1934.                M. BEDNARIK                1,962,578
LOCKING MEANS FOR HOODS OF VEHICLES OR THE LIKE
Filed Oct. 10, 1933
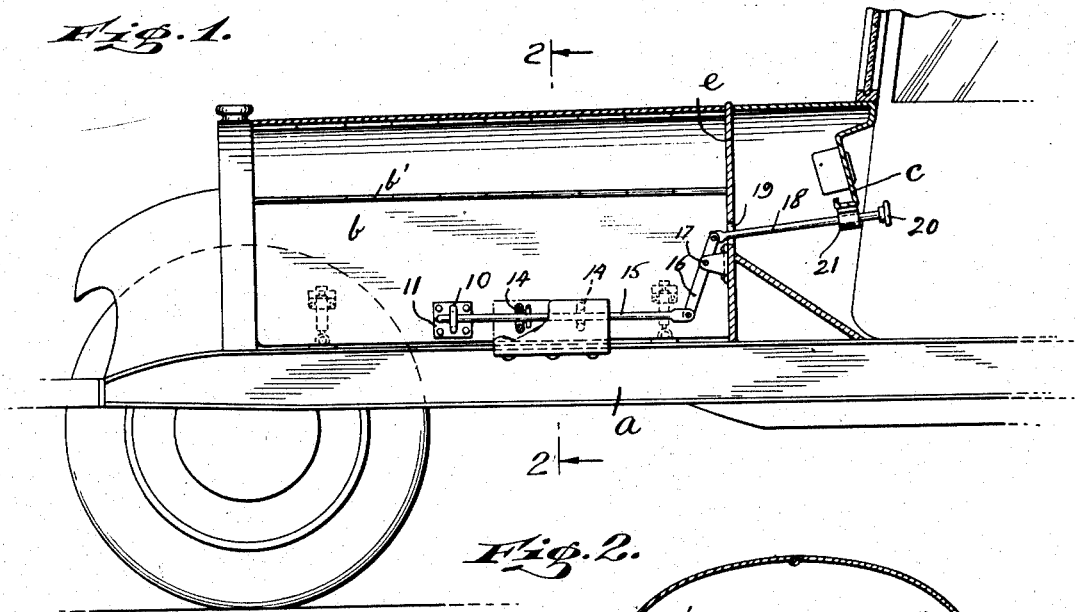
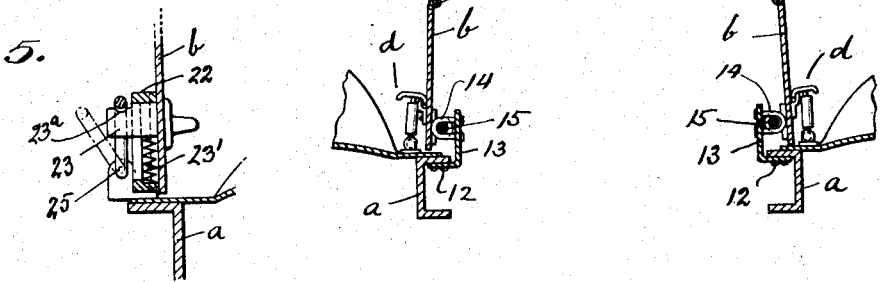
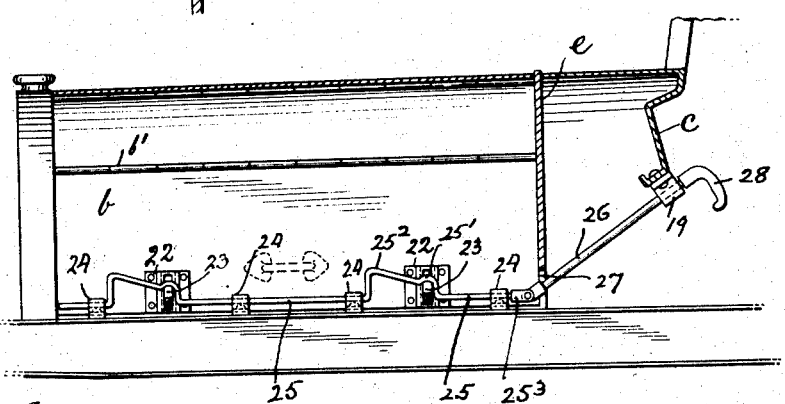
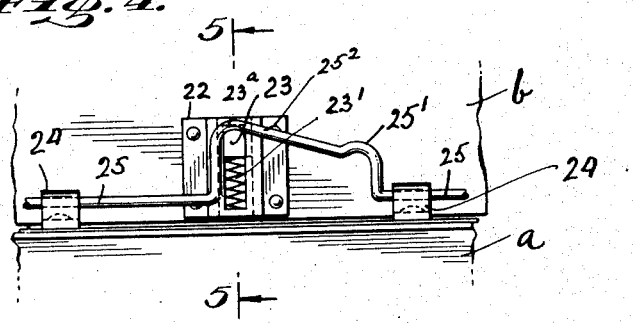
INVENTOR
Max Bednarik
BY
ATTORNEY Patented June 12, 1934

1,962,578

UNITED STATES PATENT OFFICE 1,962,578

LOCKING MEANS FOR HOODS OF VEHICLES OR THE LIKE

Max Bednarik, Westfield, N. J.

Application October 10, 1933, Serial No. 692,952

4 Claims. (Cl. 292—67)

This invention relates to vehicles, particularly to motor vehicles and has for its object to provide means whereby enclosures used for concealing parts of the vehicle can be locked in position from within the vehicle and are made inaccessible from the outside.

Thus with motor cars the hood over the motor hitherto has been locked in closed position by clutches or the like arranged on the outside of the hood. Such clutches permit access to unauthorized persons to the motor and the electric connections with the result that the motor or connections may be damaged or the motor started by such persons.

According to this invention the drawbacks are obviated by arranging locking mechanisms on the inside of the hood and providing means whereby the said mechanism can be operated from inside the vehicle, as for instance from the dash board.

To make my invention more clear the same is illustrated in the accompanying drawing in which similar reference numerals denote corresponding parts and in which Fig. 1 is a sectional side elevation of a motor vehicle equipped with my new mechanism, Fig. 2 is a cross section on line 2—2 of Fig. 1, Fig. 3 is a sectional side elevation similar to that of Fig. 1, showing a modified construction of the locking mechanism, Fig. 4 is an enlarged elevational view of a part of said modified construction and Fig. 5 is a cross section on line 5—5 of Fig. 4.

Referring more specifically to the drawing $a$ denotes the chassis, $b$ the usual hood hinged at $b'$ serving as cover for the motor (not shown) and $c$, the dashboard of the motor vehicle.

In addition to or in lieu of the usual external clutch mechanism $d$, I provide a locking mechanism inside the space covered by the hood.

The hinged hood $b$ as usual consists of two halves hingedly supported on a rod $b'$ extending longitudinally of and over the motor (not shown). According to the modification shown in Figs. 1 and 2 each half of the hood carries near its lower edge a loop or eye 10 which may be fixed thereto by a plate 11. Fixed to each side of the chassis as at 12 is a plate 13 provided with two or more guide loops 14 in which is loosely and longitudinally guided a lock bar 15 and which loops are in alignment with the eye 10 so that when said lock bar is displaced longitudinally in the forward direction its free end will engage the eye 10 and thus lock the hood in closed position, and when displaced in rearward direction it will disengage the eye and unlock the hood. The rear end of the bar 15 may be pivoted to one arm of a double armed lever 16 fulcrumed at 17 to the outer face of the front wall $e$ of the vehicle and whose other arm is pivoted to a hand operated rod 18 extending through an aperture 19 in the wall $e$ toward the dash board $c$. The front end of said rod 18 may be guided in a sleeve or socket 21 fixed to the dash board $e$ and have a grasp 20.

Such mechanism is provided for each wing or half of the hood. It will be seen that after swinging the wings of the hood $b$ into closing position the operator by pulling the rods 18 inwardly will cause the lock bars 15 to engage the eyes or loops 10 of said hood and lock the latter in closed position, so that no access can be had to the motor by an unauthorized person.

To render the locking more effective and prevent rattling of the hood while the vehicle is in motion the locking mechanism may be constructed as per modification shown in Figs. 3 to 5 inclusive. Here, each wing of the hood $b$ has fixed to its inner face near its lower edge one or more brackets 22 in which is supported a vertically guided spring actuated tongue 23 provided in its upper end with a groove or ridge 23$a$ and projecting upwardly from the chassis and adapted to be enclosed by the hood are guide loops or sockets 24 in which is rotatively and slidably borne a lock bar 25.

As in the present example there are two such tongues 23 carried by each wing of the hood the lock bar 25 is provided at two intermediate places with hook shaped portions 25' which when the lock bar 25 is shifted into locking position will come to lie just above the tongues 23 so that the latter will by the action of their springs 23' engage in their ridges 23$a$ said hook shaped portions 25' and effectively lock the hood in closed position. The parts of the lock bar adjacent to the forward ends of the hook shaped portions 25' slant in the forward direction upwardly as at 25$^2$ to such an extent that when the lock bar 25 is shifted rearwardly into unlocking position said slanting parts slide over said tongues 23 gradually releasing said tongues from the tension of their springs 23' and from engagement with said hook portions 25'.

The rear end 25$^3$ of said lock bar 25 is pivotally connected to a rod 26 which extends through an aperture 27 of the front wall $e$ of the vehicle and whose free end is rotatably and slidably borne in a sleeve 19 attached to the dash board $c$ and carries a handle or grasp 28.

By a push on the handle 28 the lock bar 25 is brought into locking position with the result that the tongues 23 become locked with the hook shaped portions 25' of the lock bar thereby locking the hood in closed position.

The unlocking of the hood can be effected first by a pull on the handle 28 thereby shifting the lock bar 25 rearwardly until the forward ends of the cam or slanting portions 25² of the lock bar are opposite the tongues 23. In this position a slight turn of the lock bar as indicated in dotted lines (Fig. 5) by a twist of the handle 28 will entirely release the lock bar from engagement with the tongues 23 and unlock the hood. This modification renders the employment of the external clutches or locking means entirely useless, since the hood will be locked in closed position most effectively and tightly.

What I claim is:

1. In a vehicle having a chassis, a hinged hood, and a member having a notch in its upper end and supported to yield vertically on the inner face of said hood, a lock bar supported on said chassis to be slidable transversely to said member and rotatable around its own longitudinal axis, said lock bar having a hook-shaped portion which in operative position engages said notch and depresses said member, thereby locking said hood, and a slanting portion adjacent and in continuation of said hook portion which when said bar is slid to disengage said hook portion from said notch will release the pressure on said yielding member whereby said lock bar may be rotated to unlock said hood.

2. In a vehicle having a hinged hood, a notched member, resilient means supporting said member on the inner face of said hood, a lock bar supported on said vehicle under said hood and slidable transversely of said member and rotatable about its own longitudinal axis, said lock bar having a hook shaped portion, the latter coming to lie over said member depressing the same and engaging the notch therein when said bar is moved into locking position thereby locking said hood, and an upwardly slanting portion adjacent to and in continuation of said hook shaped portion which when said bar is slid to disengage said hook shaped portion from said member, releases the pressure on the latter whereby said lock bar may be rotated to disengage said member and unlock said hood.

3. In a vehicle having a hinged hood, a notched member, a coil spring supporting said member on the inner face of said hood, a lock bar supported on said vehicle and slidable transversely of said yielding member and rotatable about its own longitudinal axis, said lock bar having a hook shaped portion which in operative position engages the notch in said member and is adapted to depress the latter, thereby locking said hood, and a slanting portion adjacent to and in continuation of said hook portion which when said bar is slid to disengage said hook portion from said member releases the pressure on the latter whereby said lock bar may be rotated to disengage said member and unlock said hood.

4. In a vehicle having a hinged hood, a notched member yieldably supported on the inner face of said hood, a lock bar slidably and rotatably supported on said vehicle, means thereon to effect compression of said yielding member and positively engage the notch therein in one position of said bar to lock said hood and means on said bar adjacent said first named means which when said bar is slid into a second position to disengage said first named means from said yielding member releases the pressure on the latter member whereby said bar may be rotated to completely disengage said member and unlock said hood.

MAX BEDNARIK.